March 24, 1970 HIROSHI KIMURA 3,502,946

SUPERCONDUCTING MAGNET

Filed Jan. 16, 1967 4 Sheets-Sheet 1

United States Patent Office 3,502,946
Patented Mar. 24, 1970

3,502,946

SUPERCONDUCTING MAGNET

Hiroshi Kimura, Tokyo-to, Japan, assignor to Kabushiki Kaisha Hitachi Seisakusho, Tokyo-to, Japan, a corporation of Japan Filed Jan. 16, 1967, Ser. No. 609,509
Claims priority, application Japan, Jan. 17, 1966, 41/2,229
Int. Cl. H01h *47/00*
U.S. Cl. 317—155.5 2 Claims

ABSTRACT OF THE DISCLOSURE

A superconducting magnet having a plurality of multilayer magnet coils of superconducting wire or cable connected in series, each coil being connected in a circuit comprising the coil, an individual D.C. power source connected across the coil, a variable resistor for current control connected in series with the coil, a protective resistor connected in parallel with the coil, and connecting switches respectively connected in series to the terminals of the power source.

This invention relates to superconducting magnets and more particularly to a new and improved superconducting magnet characterized by a composition and arrangement wherein a plurality of multilayer coils formed by windings of superconducting wire or cable are connected in series, and to each of these coils there is connected an individual power source.

Heretofore, it has been the common practice in designing superconducting magnets for the purpose of producing a high magnetic field to divide the coil group into concentric multilayer coils and to form these coils of wire materials of respectively different properties.

As described in detail hereinafter, such known superconducting magnets have been accompanied by certain difficulties, and the known attempts to overcome these difficulties have led to further problems.

It is an object of the present invention to eliminate or greatly reduce these problems.

One specific object of the invention is to reduce the Joule loss due to the resistances of the power leads in a cryogenic environment and the exciting current and, at the same time, to reduce the current capacity of the power source.

According to the present invention, briefly stated, there is provided a superconducting magnet which comprises a plurality of magnet coils consisting of windings of superconducting conductors which are connected in series to form a single multilayer coil, a plurality of variable resistors for exciting current control each being connected to one terminal of a respective one of said magnet coils, a plurality of connecting switches connected in series respectively to said variable resistors, a plurality of protective resistors connected across the terminals of respective magnet coils, and a power supply consisting essentially of a plurality of individual D-C power sources for respective magnet coils.

The nature, principle, utility, and details of the invention will be more clearly apparent from the following detailed description when read in conjunction with the accompanying drawings, in which like or equivalent parts are designated by like reference numerals.

In the drawings:

FIG. 1(*b*) is a graphical representation indicating the magnetic field distribution of the magnet shown in FIG. 1(*a*);

To facilitate and form the basis for a full understanding of the nature, novelty, and utility of the present invention, the following consideration of known superconducting magnets and the problems associated therewith are presented.

Figure 1A:
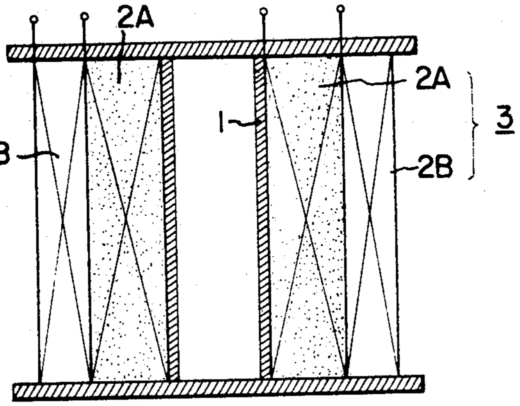
FIG. 1(a) PRIOR ART
FIG. 1(*a*) is a diagrammatic view in longitudinal section showing one example of a known superconducting magnet.
Figure 1B:
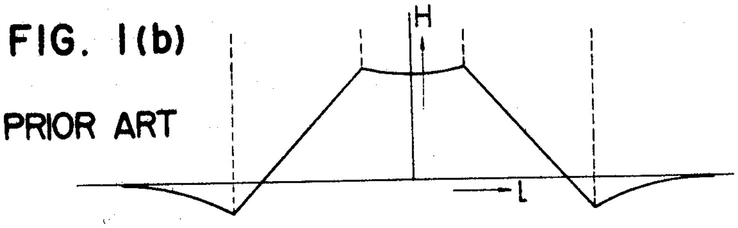
FIG. 1(b) PRIOR ART

In a typical example of a superconducting magnet as illustrated in FIG. 1(*a*) according to the aforementioned common practice, a cylindrical coil group 3 is divided into two concentric multilayer coils 2A and 2B wound coaxially on a bobbin 1 made of a nonmagnetic material.

Figure 2:
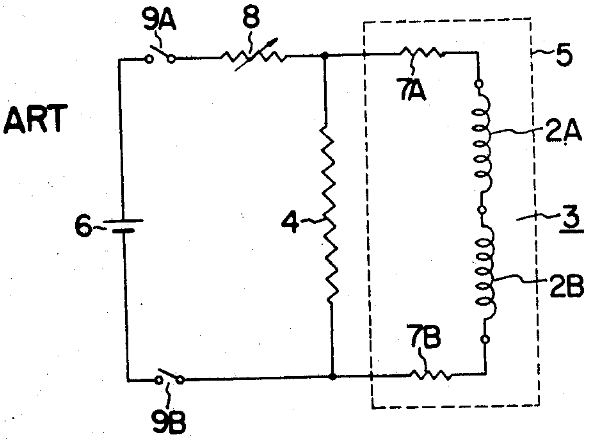
FIG. 2 PRIOR ART
FIG. 2 is a circuit diagram showing an example of a known electrical circuit for exciting a superconducting magnet.

One reason for dividing the coil group 3 in this manner is as follows. For producing a high magnetic field, a large quantity of superconductive wire material is inevitably necessary, and when coils 2A and 2B formed by this material are connected in series as shown in FIG. 2 to form a single coil 3, the value of the inductance thereof becomes extremely large. Then, if the superconductivity of the coil 3 is terminated (quenched), a high potential will be produced between the two terminals of the coil 3, and there will arise the possibility of undesirable occurrences such as rupturing of the insulation of the coil 3.

Furthermore, it is known to connect a protective resistor 4 (ordinarily placed outside the cryogenic environment 5 such as that of liquid helium around the coil 3) in parallel with the coil 3 as shown in FIG. 2 and to pass current through resistor 4 to prevent damage such as that due to overheating caused by heat loss produced in coil 3 at the time of quenching. In this case, if a low resistance value of the resistor 4 is selected in order to prevent the generation of a high voltage, the time constant when the coil 3 is considered from the power source 6 will become large, and much time will be required for the coil 3 to start. At the same time, the protective effect of magnetic energy removal at the time of quenching will be reduced.

Another disadvantage of the circuit illustrated in FIG. 2 is that the values of the exciting currents of the coils 2A and 2B are equal, and, for the reason described hereinafter, even in the case when it is desired to cause the exciting currents of the coils 2A and 2B to be mutually different, these values will be limited by the value of the smaller of the critical currents of the coils 2A and 2B and cannot be increased.

Resistances 7A and 7B in the circuit shown in FIG. 2 represents the resistances of the power leads existing within the cryogenic environment 5 (the superconducting coil exhibiting superconductivity only when it is cooled below the critical temperature thereof, ordinarily through the use of liquid helium at a temperature of 4.2 degrees K.). The circuit is provided further with a variable resistance 8 (including the resistance of the power leads at room temperature) for controlling the coil current and switches 9A and 9B.

In some cases, the coils 2A and 2B are formed from different wire materials for the following reason set forth with respect to coils formed from niobium-zirconium wire as one example of a superconductive wire material which is most widely used at present.

Figure 3:
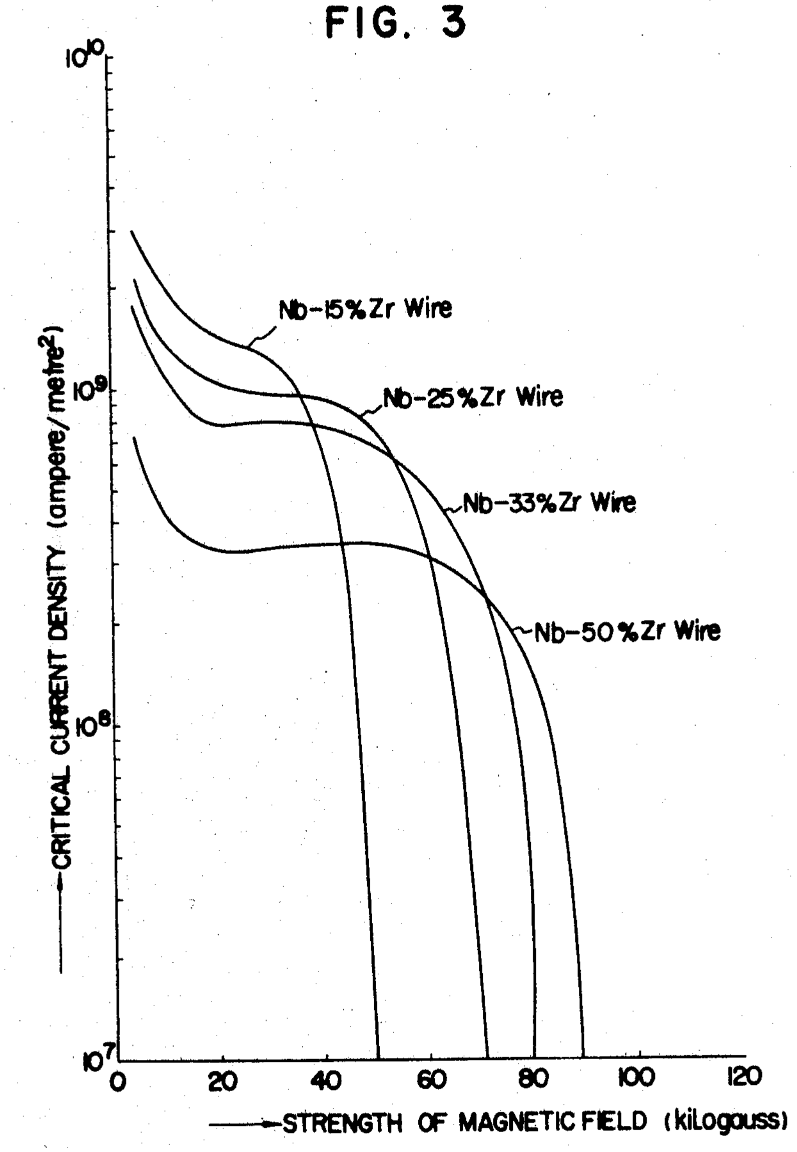
FIG. 3 is a graphical representation indicating the magnetic field strength versus critical current density characteristics of wire materials of different compositions.

From FIG. 3, indicating the magnetic field strength versus critical current density characteristics of Nb-Zr wires of 0.25-mm. diameter, it is apparent that there is a tendency for the strength of the critical magnetic field to increase and the critical current density (i.e., maximum density of current which can flow through a superconductive wire at a certain magnetic field strength) to decrease with an increase in the zirconium content of the wire material.

FIG. 1(*b*) graphically indicates the distribution of the magnetic field strength H with respect to radial distance *l* within a plane passing through the midpoint of the axis of the coil shown in FIG. 1(*a*) and disposed perpendicularly to the coil axis. From this distribution curve, it is apparent that the middle part of the innermost turns of the inner coil 2A is exposed to the maximum magnetic field strength.

Accordingly, for obtaining a magnetic field in the central part of the coil, for example, a current density of $4\times10^8$ ampere/metre$^2$ or higher and a strength of 60 kilogauss, a Nb-Zr wire having a zirconium content of from 33 to 50 percent is suitable for use in the coil 2A. Then, if the maximum field strength to which the coil 2B is subjected is of the order of 20 kilogauss, a zirconium wire material containing from 15 to 25 percent of niobium for the coil 3 is more advantageous from the viewpoint of obtaining a high current density.

Figure 4:
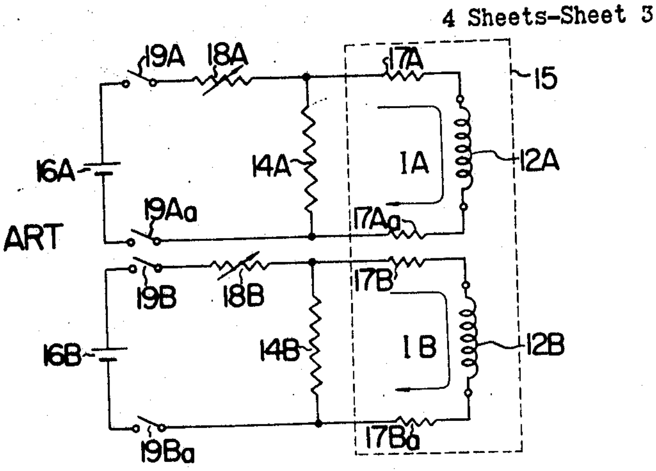
FIG. 4 PRIOR ART
FIGS. 4 and 5 are circuit diagrams respectively showing other examples of electrical circuits of known superconducting magnets.

For the purpose of eliminating the problems of the circuit arrangement illustrated in FIG. 2, a circuit arrangement as shown in FIG. 4 has been proposed. In this circuit, the coil is divided into coils 12A and 12B to which protective resistors 14A and 14B, respectively, are connected in parallel, and which are respectively connected to individual power sources 16A and 16B by way of current control variable resistors 18A and 18B and switches 19A, **19A*a*, 19B, and 19B*a*. Furthermore, exciting currents IA and IB are supplied in an independently variable manner to the coils 12A and 12B, respectively. The enclosure designated by reference numeral 15 represents a cryogenic environment created by liquid helium, and resistances 17A, 17A*a*, 17B, 17B*a*** therewithin represent the resistances of the power leads within this cryogenic environment.

Figure 5:
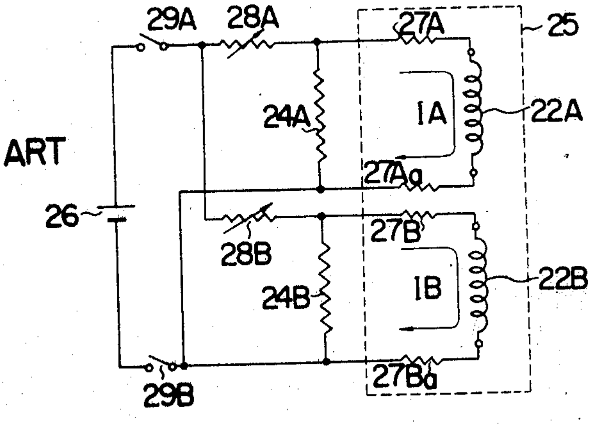
FIG. 5 PRIOR ART

In another proposed circuit as illustrated in FIG. 5, coils 22A and 22B are connected to a single common power source 26 respectively by way of current control variable resistors 28A and 28B and common switches 29A and 29B. Resistances 27A, **27A*a*, 27B, and 27B*a* represent the resistances of power leads within the cryogenic environment 25. Protective resistors 24A and 24B are respectively connected in parallel with the coils 22A and 22B**.

In general, the resistance value of a superconductive coil is zero since it is used at a temperature below its critical temperature, but the Joule loss due ot resistances of the power leads within the cryogenic environment and the exciting current represents the most important source of heat loss.

As mentioned hereinbefore, an object of the present invention is to reduce this Joule loss and, at the same time, to decrease the current capacity of the power source.

Figure 6:
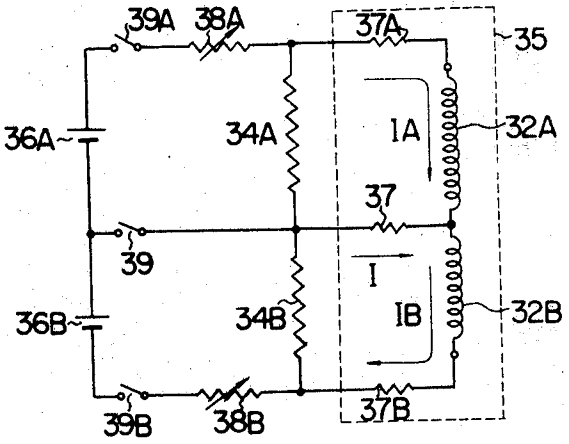
FIG. 6 is a circuit diagram showing an example of an electrical circuit of a superconducting magnet embodying the present invention.

The above object has been achieved by the present invention in one preferred embodiment thereof as illustrated in FIG. 6 by connecting, in series, multilayer coils, i.e., two concentric multilayer coils 32A and 32B in the example illustrated, and connecting respectively thereto independent D.-C. power sources 36A and 36B. In addition there are provided protective resistors 34A and 34B, current control variable resistors 38A and 38B, switches 39A, 39, and 39B, and a cryogenic environment 35 created by liquid helium, the resistances of the power leads therewithin being designated by 37A, 37, and 37B.

In an actual instance, a superconducting magnet with a circuit of the above described composition and arrangement, with coils 32A and 32B respectively as inner and outer coils, was prepared in accordance with the specification set forth in the following Table 1 and operated by passing exciting currents IA=16 amperes and IB=20 amperes respectively through coils 32A and 32B. As a result, it was found that the strength of the magnetic field at the central part of the coils was 18.4+38.2=56.6 kilogauss.

TABLE 1

| Coil | Wire material | Wire diameter (mm.) | Wire length (km.) | Winding turns | Coil current (amp.) | Field strength (kilogauss) |
|---|---|---|---|---|---|---|
| Inner coil 32A | Nb-33% Zr | 0.25 | 1.54 | 11,390 | 16 | 18.4 |
| Outer coil 32B | Nb-25% Zr | 0.25 | 5.13 | 21,440 | 20 | 38.2 |

FURTHER SPECIFICATION (1) For power leads to the coils within the cryogenic environment 35, Phosphor-bronze rods of 3-mm. diameter and resistance of approximately 0.01 ohm were used.

(2) The resistance value of each of the parallel protective resistors 34A and 34B was approximately 100 ohms, and, when the exciting currents reached a steady state, the currents flowing through these resistors 34A and 34B were caused to be negligibly small relative to the currents IA and IB flowing through the coils 32A and 32B.

A comparison of the total Joule losses due to resistances of the power leads within the cryogenic environment in the case of the magnet circuit shown in FIG. 6 embodying the present invention and in the cases of known magnet circuits as illustrated in FIGS. 4 and 5 is indicated in Table 2. In Table 2, symbols I, IA, and IB denote the respective currents indicated in FIGS. 4, 5, and 6.

TABLE 2

| Magnet circuit | Currents (amp) | | | Current control variable resistances (ohm) | | Total Joule loss (watt) | Source voltage (v.) | Source current (amp.) |
|---|---|---|---|---|---|---|---|---|
| | IA | IB | I | | | | | |
| Fig. 6 | 16 | 20 | 4 | (38A) 0.3675 | (38B) 0.288 | 6.72 | (36)A 6<br>(36B) 6 | 16<br>20 |
| Fig. 4 | 16 | 20 | | (18A) 0.355 | (18B) 0.28 | 13.12 | (16A) 6<br>(16B) 6 | 16<br>20 |
| Fig. 5 | 16 | 20 | | (28A) 0.355 | (28B) 0.28 | 13.12 | (26) 6 | 36 |

While wires of the same diameter and same length, that is, of the same resistance value are used as the three power leads in the example illustrated in FIG. 6, the wire diameters thereof may be decreased to values such as will cause the Joule losses of the three leads to be substantially equal (for example, the diameter of the lead wire through which the current I flows in this example may be decreased to 0.75 mm.). This measure is advantageous in that a decrease in the lead wire diameter reduces heat conduction into the cryogenic environment 35 but is disadvantageous in that the Joule loss increases. Accordingly, the lead wire diameter is determined by a suitable balance between the Joule loss and the heat conduction into the cryogenic environment 35.

Figure 7:
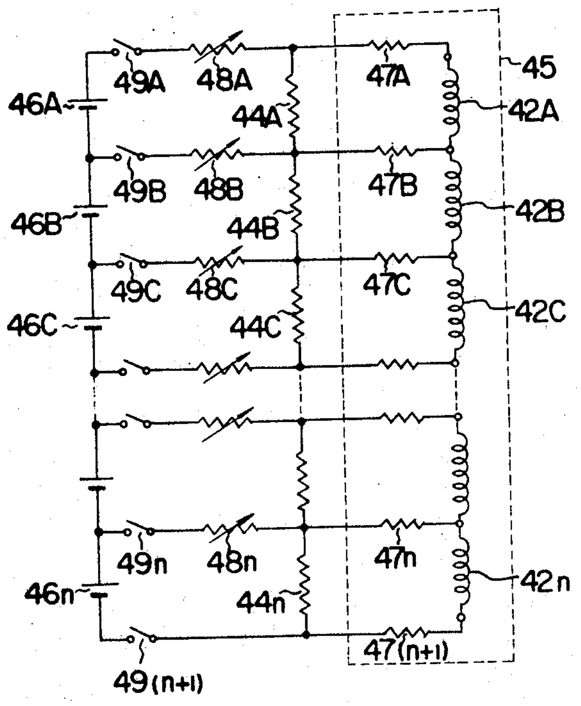
FIG. 7 is a circuit diagram showing another embodiment of the present invention.

While the invention has been described above with respect to two multilayer coils, the present invention can be applied in the same manner and with equivalent effectiveness also to three or more multilayer coils as exemplified by another preferred embodiment of the invention shown in FIG. 7.

In this superconducting magnet circuit, there are provided multilayer coils 42A, 42B . . . **42*n* connected in series and provided respectively with protective resistors 44A, AAB . . . 44*n*, variable resistors 48A, 48B . . . 48*n* for exciting current control, D.C. power sources 46A, 46B . . . 46*n* for supplying exciting current respectively to the coils 42A, 42B . . . 42*n*, and change-over switches 49A, 49B . . . 49** (*n*+1). The resistances of the power leads of the coils within a cryogenic environment 45 of liquid helium are respectively represented by resistances 47A, 47B . . . 47 (*n*+1).

It will be apparent also from the foregoing description that, even with respect to a single multilayer coil formed from one kind of wire material, there are some cases in which it is better to divide this coil into a plurality of sections and to cause the magnitude of the current passing therethrough to increase outwardly, that is, by passing a small current through the innermost section where the magnetic field is high and progressively increasing the current in the outer sections as their distances from the coil center increase. The present invention is applicable also to such cases.

As described above, in the superconducting magnet according to the present invention it is possible to not only control respectively at desired values the exciting currents of the multilayer coils but to also reduce the Joule loss in the cryogenic environment substantially with respect to that of known magnets of similar type as indicated in Table 2.

Since the efficiency of helium liquefiers available at present is of the order of $10^{-3}$, a heat loss of 1 watt at the temperature of liquid helium is equivalent to a loss of 1 kilowatt of power at room temperature. Thus, the effectiveness of the present invention in reducing the Joule loss is of high value. This feature of the invention is all the more important in view of the present trend in superconducting magnets for ever increasing strengths of magnetic fields produced over ever widening spaces.

Furthermore, as also indicated in Table 2, the required power source current in the superconducting magnet of this invention is substantially lower than that of the known magnet circuit shown in FIG. 5. This is another important feature of the invention as described below.

The present trend in large superconducting magnets is toward the use of superconducting stranded wire cables and superconductive ribbons for the coils, and the current passed through a single conductor is as high as from 100 to several hundreds of amperes. Consequently, the known circuit arrangement illustrated in FIG. 5, if applied to such large magnets, would have the disadvantage of requiring a power source of extremely large current capacity and power leads from the power source to the coils of extremely large diameter.

In contrast, the power source voltage applied to a single coil in the superconducting magnet of the present invention is of the order of from a few volts to 10 volts. Therefore, even when the number of power sources is increased, the required current capacities are small, and the required power lead diameter is small.

Figure 8:
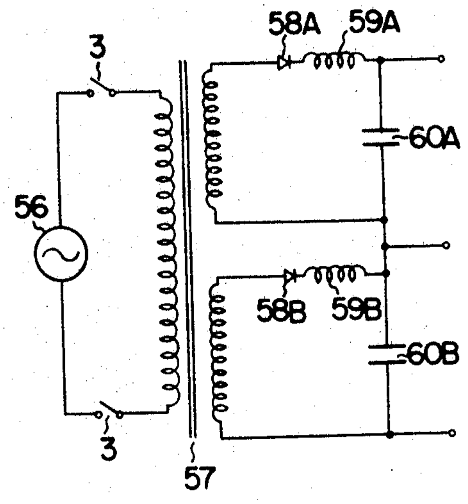
FIG. 8 is a circuit diagram of one part of still another embodiment of the present invention.

While the invention has been described with respect to examples thereof in which D.C. power sources are used directly, use may be made, alternatively, of a power source device, as illustrated in FIG. 8, comprising an A.C. power source 56, a transformer 57 having an input winding to which the power source 56 is connected and independent output windings, rectifiers 58A and 58B connected in series respectively to the output windings, current choke coils 59A and 59B connected in series respectively to the rectifiers 58A and 58B, and smoothing capacitors 60A and 60B connected in parallel with respective output windings of the transformer 57.

Figure 9:
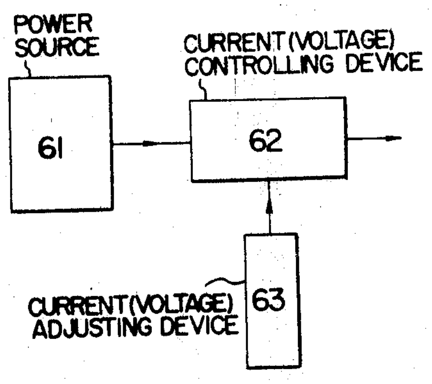
FIG. 9 is a block diagram of one part of a further embodiment of the present invention.

Furthermore, in place of variable resistors for control of exciting currents, use may be made of a current (voltage) controlling device 62 in which vacuum tubes or transistors are used for regulating the output current (voltage) of a power source 61 and a current (voltage) adjusting device 63 for adjusting the controlling device 62 as shown in FIG. 9 thereby to control the exciting currents of the coils. Alternatively, a power source (not shown) with variable voltage may, of course, be used for each D.C. power source to obtain control of the exciting current of the corresponding coil.

What I claim is:

1. A superconducting magnet comprising: a plurality of *n* serially connected coils of superconducting material having *n*+*l* power leads; a plurality of variable resistors for controlling exciting currents of the respective coils, each of said variable resistors being connected to one terminal of each of said coils; a plurality of switches connected in series with said variable resistors, respectively; a plurality of protective resistors each connected across the terminals of each of said coils; power supply means including a plurality of D.C. power sources, each of said D.C. power source being connected in series with each of said coils, and means for maintaining said coils at a temperature below the superconducting transition temperature thereof.

2. A superconducting magnet comprising: a plurality of serially connected coils of superconducting material; a plurality of variable resistors for controlling exciting currents of the respective coils, each of said variable resistors being connected to one terminal of each of said coils; a plurality of switches connected in series with said variable resistors, respectively; a plurality of protective resistors each connected across the terminals of each of said coils; and power supply means comprising a single A.C. power supply, a transformer having an input winding connected to the A.C. power supply and a plurality of independent output windings provided with an equal number of winding turns to that of said coils, a plurality of rectifiers each connected to one terminal of each of said output windings, a plurality of current choking coils each connected in series with each of said rectifiers, and a plurality of current smoothing capacitors each connected across the terminals of each of said output windings.

References Cited

UNITED STATES PATENTS

| | | | |
|---|---|---|---|
| 3,219,841 | 11/1965 | Edwards et al. | 307—306 XR |
| 3,256,464 | 6/1966 | Stauffer | 317—9 |
| 3,263,133 | 7/1966 | Stekly | 317—123 |
| 3,360,692 | 12/1967 | Kafka | 317—123 |

FOREIGN PATENTS

| | | |
|---|---|---|
| 1,222,526 | 1/1960 | France. |

LEE T. HIX, Primary Examiner

W. M. SHOOP, JR., Assistant Examiner

U.S. Cl. X.R.

307—306; 340—173.2